United States Patent [19]

FitzGerald et al.

[11] Patent Number: 4,640,541
[45] Date of Patent: Feb. 3, 1987

[54] UNDER-TRAILER AIR DEFLECTOR

[75] Inventors: Joseph M. FitzGerald; James P. FitzGerald, both of Buena Park, Calif.

[73] Assignee: FitzGerald Corporation, Buena Park, Calif.

[21] Appl. No.: 776,845

[22] Filed: Sep. 17, 1985

[51] Int. Cl.⁴ .............................................. B62D 35/00
[52] U.S. Cl. ................................ 296/1 S; 280/154.5 R
[58] Field of Search .................... 296/1 S, 91; 105/2 R; 280/154.5 R

[56] References Cited

U.S. PATENT DOCUMENTS

| 3,971,586 | 7/1976 | Saunders | 105/2 R |
| 4,021,069 | 5/1977 | Hersh | 296/1 S |
| 4,455,045 | 6/1984 | Wheeler | 105/2 R |

FOREIGN PATENT DOCUMENTS 1156293  1/1983  Canada ................. 296/1 S

Primary Examiner—Robert B. Reeves
Assistant Examiner—Carol L. Olson
Attorney, Agent, or Firm—Jones, Tullar & Cooper

[57] ABSTRACT

An air deflector for the rear wheels of vehicles such as trucks and trailers is disclosed. The deflector consists of a fairing suspended beneath the truck or trailer body immediately in front of the rear wheels and extending completely across the width of the body. The surface of the fairing is curved in both a lateral and a vertical direction to deflect impinging air and entrained water or snow around or under the wheels. In a preferred form, the device is formed with a plurality of generally vertical grooves angled toward the center line of the vehicle. The grooves direct impinging air downwardly and between the rear wheels. The air deflector serves to suppress splashing and spraying of water from the roadway and of rain or snow, and reduces aerodynamic drag to improve handling and reduce fuel consumption.

11 Claims, 9 Drawing Figures

UNDER-TRAILER AIR DEFLECTOR

BACKGROUND OF THE INVENTION

The present invention relates, in general, to devices for reducing aerodynamic drag on road vehicles, and, more particularly, to an air deflector for directing air flow around and under the rear suspension, axles, wheels, tires, brake chambers, slack adjusters, and hangers under vehicles such as trucks and trailers.

Trucks, and particularly tractor-trailer units having multiple rear wheels, present a high resistance to air flow with the rear wheels, suspension, and other mechanical components at the rear of the vehicle interfering with the smooth flow of air around and under the vehicle. This interference creates turbulence and a high aerodynamic drag which results in high fuel use and a high cost of operation. Furthermore, the turbulent flow creates a hazard for the drivers of other vehicles when it is raining or snowing, or the roadway is wet, for in such a situation, the rain or snow and any water splashed up from the roadway by the tires swirls around the tires and is thrown outwardly by the tires themselves and by the turbulent air flow. When this splashing and spraying water strikes the windshields of other vehicles, it lowers visibility for such motorists, and can cause them to lose control of their vehicles. Further, the spray raised by the rear tires reduces the truck driver's vision of the rear of the truck, making it more difficult for the truck driver to handle his vehicle when it's moving in traffic.

In recognition of the serious problem presented by the creation of spray by trucks, and particularly by multi-wheeled trailers, the Surface Transportation Act of 1982 has required that splash and spray be significantly reduced on trucks and trailers on highways.

The mechanical structure at the rear of a truck or trailer also creates stability problems, for the turbulent flow created by such structures interferes with the tracking of the rear wheels on wet or icy roadways. The rear wheels of a trailer are particularly susceptible to loss of control in yaw wind angles, where an angled cross wind strikes against the side of the trailer, and tends to blow it off track. The mechanical structure of the rear wheels, suspension and the like, cause such angled winds to interfere with the stability of the trailer, increasing the danger of serious handling problems.

SUMMARY OF THE INVENTION

It is an object of the present invention to overcome the problem of splash and spray of water by the rear wheels of trucks and trailers.

It is another object of the invention to provide an air deflector for vehicles to reduce the outward spraying of road water and rain.

Another object of the invention is to reduce the aerodynamic drag of vehicles such as trucks and trailers.

A further object of the invention is to provide an air deflector for vehicles to provide a smooth flow of air around the rear wheels and suspension thereof to reduce air deflector drag.

A still further object of the invention is to provide an air deflector for the rear wheels of vehicles such as trucks and trailers to reduce the splash and spray of water by the wheels, and to reduce air deflector drag.

Briefly, the present invention is directed to an air deflector for the rear wheels of vehicles such as trucks and trailers. The air deflector consists of a curved, shaped fiberglass fairing which is suspending below the vehicle body in front of the wheels. The deflector is curved both downwardly and laterally to direct air flow around and under the wheels, suspension, and other mechanical structures under the rear portion of the vehicle. The directed air flows down between the rear wheels, generally along the center line of the truck or trailer, creating a negative pressure between the wheels with respect to the air at the sides of the trailer, and causing air to flow inwardly and to exit at the rear of the vehicle. The inward air flow helps to cool the brakes, and also serves to draw water splashed by the tires inwardly, thereby substantially reducing the outward spray of water normally produced by the tires.

The air deflector in one embodiment has a continuous, contoured forward surface having the general shape of the drag reducing apparatus described in U.S. Pat. No. 4,021,069, which is hereby incorporated herein by reference. The deflector used is upside-down from that shown in U.S. Pat. No. 4,021,069, so that air is deflected downwardly instead of upwardly. From its area of maximum forward extension, the deflector is curved downwardly to its bottom edge and outwardly to its side edges in a surface which may be described as a perturbed paraboloid of revolution, with the peripheral edges defining a rectangle so that it can be secured to the trailer. The surface portion from the area of maximum extension upwardly is curved slightly, with the exact shape being determined by the vertical dimensions required for the deflector. The surface of the fairing is substantially symmetrical in a lateral direction about a vertical plane passing through the center line of the fairing, so that a part of any impinging air is directed laterally toward the side edges. The fairing is asymmetrical vertically, with the area of maximum extension being disposed above the horizontal center line of the fairing, so that the lower fairing surface below the area of maximum extension is substantially longer than the upper fairing surface thereabove, so that a part of any impinging air is deflected downwardly and between the vehicle rear wheels.

In a second, preferred, form of the invention, the surface of the deflector carries a plurality of deep, generally vertical grooves which are angled inwardly toward the center of the fairing, and thus of the vehicle, as well as deep horizontal grooves at the sides. These grooves direct air flow around and under the tires, the horizontal grooves deflecting air outside the tires and along the top thereof, and the vertical grooves deflecting air between the tires. The vertical curvature of the ungrooved portion of the deflector serves to direct air downwardly under the tires, while the lateral curvature serves to direct air outside the tires. This air flow directs rain, snow, water, and air under the axles and between the tires and wheels, and creates a negative pressure between the wheels which tends to pull air inwardly over the brake drums. The acceleration of air around the tires and wheels of the vehicle serves to suppress water spraying and splashing.

The aerodynamic shape of the deflector insures a smooth, reduced turbulence flow of air around the tires and other mechanical structure of the vehicle, and this improves the tracking and stability of the trailer. Yaw angle winds are deflected by the shape of the device, and have less tendency to blow the rear of a trailer off course on wet or icy roadways.

BRIEF DESCRIPTION OF THE DRAWINGS

The foregoing and additional objects, features, and advantages of the present invention will be more fully appreciated by those of skill in the art from the following detailed description of preferred embodiments thereof, taken in conjunction with the accompanying drawings, in which.

DESCRIPTION OF PREFERRED EMBODIMENTS

Figure 1:
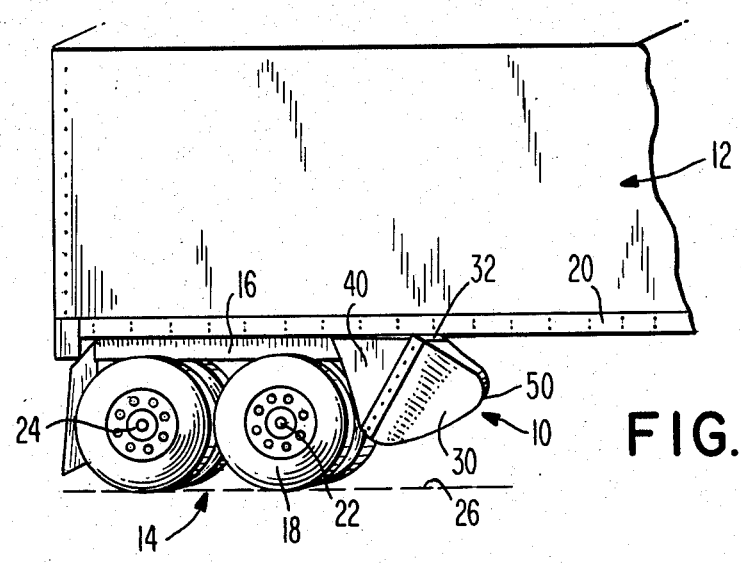
FIG. 1 is a perspective view of an air deflector mounted on a trailer in accordance with the present invention.

Turning now to a more detailed consideration of the present invention, an air deflector 10 is shown in FIG. 1 as being mounted under the rear portion of a trailer 12, the deflector being located just in front of the undercarriage 14. The deflector is rigidly secured to the frame of the trailer, such as to the longitudinal beam 16 which carries the wheel assembly 18 and to the lower edge rail 20 of the trailer body. The deflector 10 extends laterally across the width of the trailer, and extends downwardly from the trailer body in front of the undercarriage for a distance which positions the lowermost edge of the deflector below the axles 22 and 24 of the wheel assembly 18, and preferably about halfway between the axles and the surface of the road, indicated by the dotted line 26. It will be understood that although reference is made to a trailer 12, the deflector could equally well be mounted beneath a truck body, in front of the rear wheels thereof. However, for convenience, the present description will have reference to a trailer mounting for the deflector.

Figure 3:
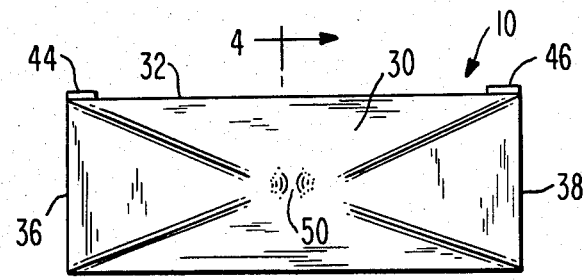
FIG. 3 is a front elevation of the deflector of FIG. 1.

The air deflector 10 is a hollow, contoured fairing element which has a forwardly extending contoured front surface 30 shaped to deflect impinging air streams, both from head-on and from a quartering or generally crosswise direction, to reduce the air resistance of the undercarriage of the vehicle and to thereby substantially improve the handling characteristics of the vehicle. As viewed from the front (FIG. 3), the deflector 10 is generally rectangular in outline for mounting under the trailer, the deflector extending completely across the width of the trailer. The top edge 32 of the deflector is closely adjacent the bottom of the trailer when the deflector is mounted thereon, so that the upper front surface 30 deflects air that is close to the trailer to one side or the other, while the bottom edge 34 is suspended below the trailer so that the lower portion of the front surface 30 deflects air downwardly as well as to the sides. The bottom edge is suspended above the roadway 26 about midway between the axle and the road surface, sufficiently high to provide road clearance, but sufficiently low to provide a substantial reduction in aerodynamic drag and in water spray.

Figure 2:
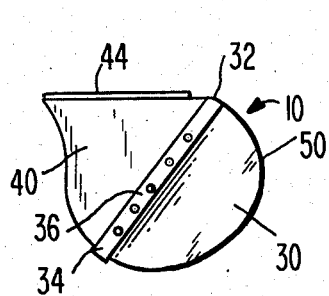
FIG. 2 is a side elevation of the deflector of FIG. 1.
Figure 4:
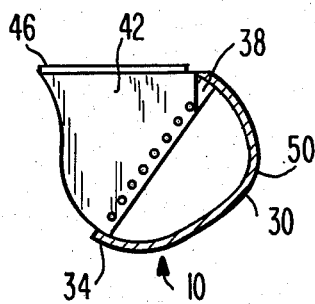
FIG. 4 is a cross-sectional view taken along lines 4—4 of FIG. 3.
Figure 5:
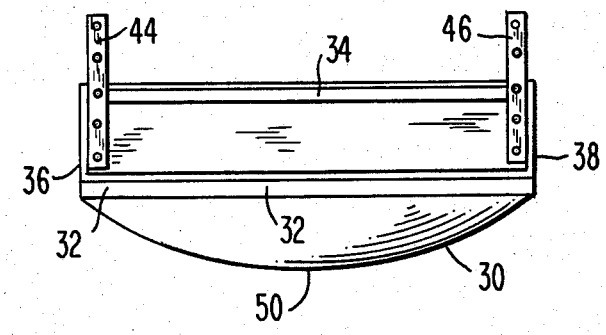
FIG. 5 is a top plan view of the deflector of FIG. 1.

As shown in FIGS. 2, 4, and 5, the side edges 36 and 38 of the deflector 10 are secured, as by rivets or other suitable fasteners, to a pair of vertical mounting brackets 40 and 42 which are mounted, as by means of flanges 44 and 46, respectively, to the under surface of trailer body 12. The brackets are shown in the form of panels which assist in directing air around the tires. Additional mounting brackets (not shown) may be provided as required to secure the air deflector 10 rigidly in place.

The deflector 10 is preferably molded of fiberglass for strength and rigidity, but other materials may be used. The front surface 30 of the deflector includes a lower portion which is curved downwardly and laterally from an area 50 of maximum forward extension to define a surface which may be described as a perturbed paraboloid of revolution, with the outer edges 32, 34, 36, and 38 forming a rectangle. The surface 30 above the area 50 of maximum extension curves upwardly to the upper edge 32, the exact shape of the curve depending upon the size and relative horizontal and vertical dimensions of the deflector. The lower paraboloid portion of surface 30 provides the major aerodynamic qualities of the deflector.

Figure 6:
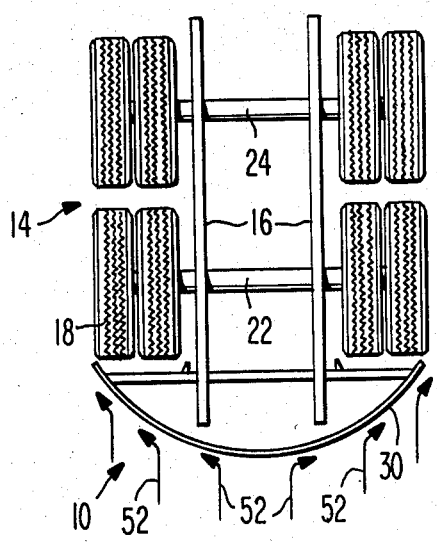
FIG. 6 is a diagrammatic illustration of the operation of the device of FIG. 1.

As diagrammatically illustrated in FIG. 6, the front surface 30 of the air deflector 10 directs impinging air to the sides of the wheel assembly 18 of the trailer undercarriage 14, as indicated by arrows 52. This causes the air to flow along the outside of the trailer to deflect water spray to the rear and to reduce turbulence in the area of the undercarriage. This tends to stabilize the trailer, particularly on wet pavement, as well as improving the safety of the roadway for other motorists by reducing the spray thrown by the wheels of the wheel assembly 18.

Figure 7:
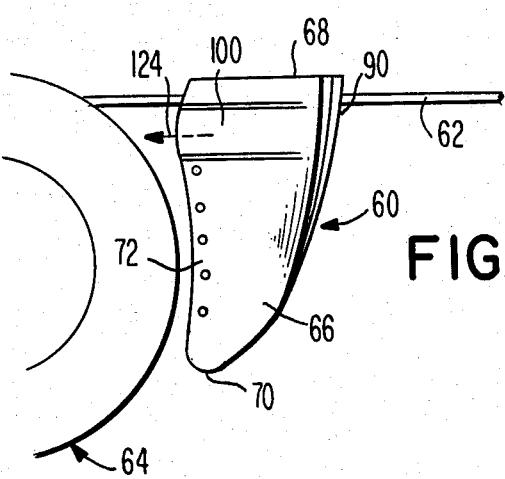
FIG. 7 is a partial side elevation view of a trailer having a modified air deflector according to the present invention.
Figure 8:
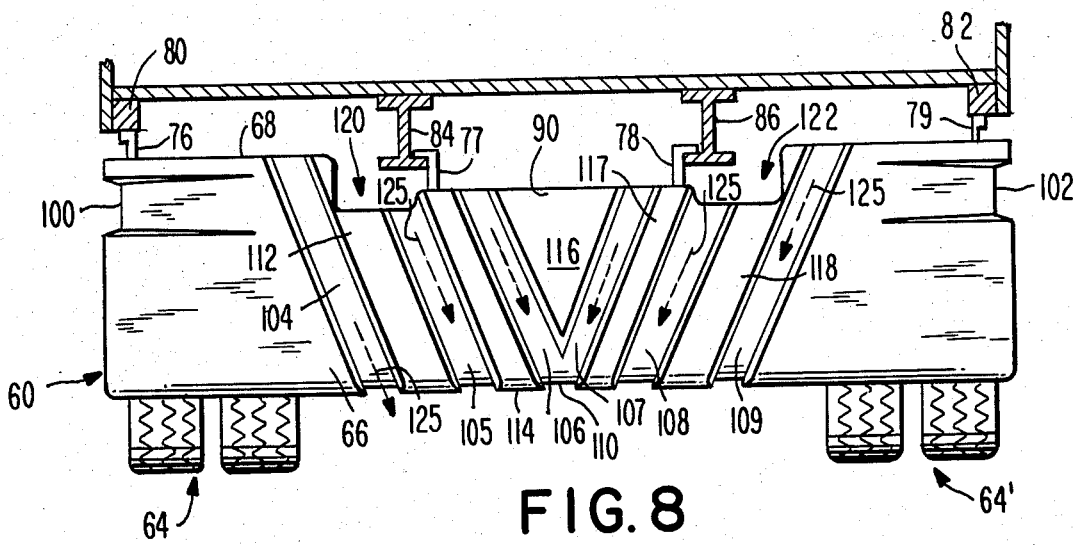
FIG. 8 is a front elevation view of the air deflector of FIG. 7.
Figure 9:
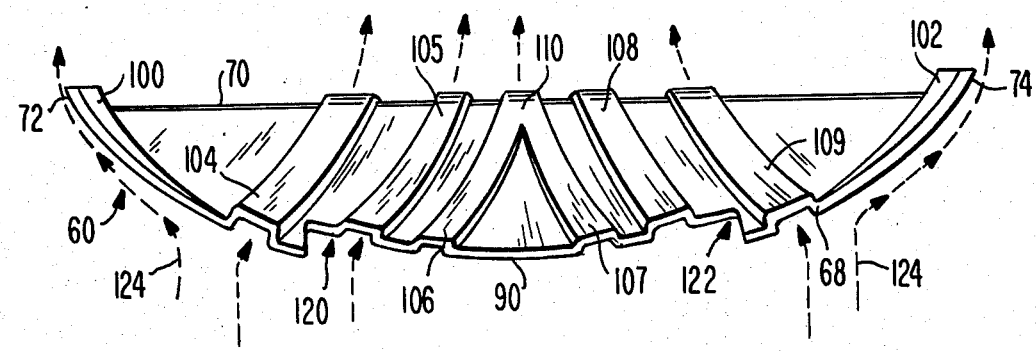
FIG. 9 is a top plan view of the air deflector of FIGS. 7 and 8.

A modified version of the air deflector is illustrated in FIGS. 7-9, to which reference is now made. The modified air deflector 60 is shown in FIG. 7 as being mounted under the body 62 of a trailer having an undercarriage which incorporates conventional wheel assemblies 64 and 64' on opposite sides thereof. The air deflector 60 is a fairing, preferably of molded fiberglass, which is curved both vertically and laterally, and is mounted in front of the wheel assemblies 64 and 64' to deflect air below and around them. The deflector includes a front surface 66 which terminates in top and bottom edges 68 and 70 and side edges 72 and 74 which define a generally rectangular base. The rectangular deflector extends from the trailer body 62 downwardly to a location about midway between the wheel assembly axles and the road surface, and extends across the entire width of the trailer body, so that the edges 72 and 74 extend slightly beyond the outermost wheels of the wheel assemblies. The deflector 60 is rigidly secured to the trailer body by suitable brackets such as the brackets 76-79 secured to adjacent side rails 80 and 82 and support beams 84 and 86.

The side edges 72 and 74 are essentially vertical, as shown in FIG. 7, but preferably are slightly curved to the shape of the adjacent wheels, to avoid possible interference. The front surface 68 of the deflector curves substantially continuously in a lateral direction from side edge 72 to side edge 74, as illustrated in FIG. 9, with the greatest curvature occurring at the lateral sides, and a gradually curved portion extending across the center of the deflector in the region generally between the wheel assemblies 64 and 64'. The area of maximum foward extension 90 for deflector 60 is at its lateral midpoint, at about the top edge 68 thereof.

The front surface 66 of the deflector 60 also curves downwardly and rearwardly from the top edge 68 to the bottom edge 70, as most clearly seen in FIG. 7, thereby providing a surface which deflects impinging air downwardly under the undercarriage of the trailer and under the wheels.

To improve the flow of air around and through the undercarriage of the vehicle, the air deflector 60 incorporates a plurality of air flow channels which may be grooves formed as depressions in the forward surface 66. As illustrated, the air deflector includes a pair of generally horizontal grooves 100 and 102 which extend around the lateral portions of the deflector near the upper edge 68 thereof. The grooves are relatively deep at the edges 72 and 74, but are gradually reduced in depth toward the forward extent of the deflector. The tapered grooves 100 and 102 are directed toward the upper portion of the wheel assemblies 64 and 64' and serve to direct air along the top outer surfaces of the assemblies to deflect any water that might be sprayed outwardly by the vehicle tires.

The air deflector fairing 60 also includes generally vertically disposed grooves 104–109 spaced along the surface 66 in the central region thereof between the wheel assemblies 64 and 64'. The grooves are generally angled inwardly toward the center line of the fairing, and thus of the vehicle, so as to direct impinging air inwardly and downwardly between the wheel assemblies. In the illustrated embodiment, the outermost grooves 104 and 109 are relatively deep at the top edge 68 of the deflector and slope inwardly from the region of the innermost extent of the wheel assemblies down toward the center line of the vehicle at an angle which will depend upon the size of the deflector and the number and width of the grooves, but which may be on the order of between about 15 degrees and 30 degrees from the vertical. The grooves 104 and 109 may of uniform depth throughout their length, and terminate at the lower edge 70 of the deflector. Alternatively, the grooves may taper in depth from the top edge 68 to a shallower depth at the bottom edge 70, or may taper to be flush with the surface 66 at the edge 70.

The grooves 105 and 108 are spaced inwardly from grooves 104 and 109, respectively, and are generally parallel thereto. Thus, grooves 105 and 108 are angled inwardly toward the center of the vehicle, and may either be of uniform depth from the top edge 60 to the bottom edge 70, or may be tapered as described with respect to grooves 104 and 109.

Grooves 106 and 107 are spaced inwardly from grooves 105 and 108 and are parallel thereto, being angled toward the center line of the vehicle. In the illustrated embodiment, the grooves 106 and 107 merge and form a single groove 110 at the bottom of the deflector. Again, the grooves 106, 107, and 110 may be of a constant depth, or may be tapered from the upper edge 68 to a zero depth at the bottom edge 70.

The grooves 104–109 leave land areas 112–118 therebetween, which land areas are part of the continuous curve defined by the surface 66 both laterally and vertically.

The top edge 68 may be linear, but in the illustrated embodiment it includes depressions 120 and 122 which accommodate the frame members 84 and 86 of the truck body.

The grooves formed in the air deflector 60 serve to direct impinging air either outwardly along the upper portion of the wheel assemblies 64 and 64', as indicated by the arrows 124 in FIGS. 7 and 9, or downwardly and inwardly as indicated by the arrows 125 in FIGS. 8 and 9. The impinging air thus is deflected around and under the trailer undercarriage, which includes the rear suspension, axles, wheel, tires, brake chambers, slack adjusters, and hangers, all of which are conventional in trailers, thereby substantially reducing the aerodynamic drag of these components. When the vehicle is travelling on wet roads, the impinging air, which is directed toward the deflector by the motion of the vehicle and by any existing wind, carries moisture in the form of rain or snow, or water splashed up from the road by the front tires of the vehicle. This entrained moisture is deflected with the air to flow either around or under the vehicle undercarriage, thereby preventing the rear wheels from spraying or splashing this moisture outwardly into the path of passing vehicles. Furthermore, the flow of air downwardly between the wheel assemblies creates a negative pressure under the rear of the trailer between the wheel assemblies which tends to produce an inward flow of air. This inward flow draws air over the brakes to cool them, and, in addition, draws splashed moisture from the tires inwardly under the trailer, thereby suppressing the outward spraying of moisture. This spray suppression is an important safety feature of the present invention. The drawing of air downwardly and inwardly also tends to stabilize the trailer, even in the presence of crosswinds, thus providing an additional margin of safety.

Although the present invention has been described in terms of preferred embodiments, it will be apparent that the invention is not limited thereto, but encompasses numerous modifications and variations within the scope of the following claims.

What is claimed is:

1. An air deflector for reducing the aerodynamic drag of the wheels of a rear wheel assembly for vehicles such as trucks and trailers and for suppressing the spraying of water by such wheels, comprising:

an aerodynamic fairing adapted to be mounted beneath the body of a vehicle and immediately forward of a rear wheel assembly of the vehicle, said fairing including:

top, bottom, and first and second side edges defining a generally rectangular fairing body for extending laterally completely across the body of the vehicle and for extending beyond the rear wheel assembly on each side of the vehicle;

a continuous, contoured front fairing surface extending away from said top, bottom, and side edges and converging from said edges to an area of maximum extension located between said side edges, said front fairing surface being curved substantially symmetrically in a lateral direction about a vertical plane passing through the center line of said fairing so that a part of any impinging air is directed toward said first and second side edges and around the rear wheel assembly of a vehicle;

said fairing surface being curved asymmetrically in a vertical direction, with said area of maximum extension being disposed above the center of said fairing so that the distance along the lower fairing surface between said area of maximum extension and said bottom edge is substantially longer than the distance along the fairing surface between said area of maximum extension and said top edge, the lower fairing surface curving laterally, downwardly and rearwardly toward said side and bottom edges and the upper fairing surface curving laterally, upwardly and rearwardly toward said side and top edges; and said fairing being adapted to extend downwardly from said vehicle body so that a portion of any impinging air is directed downwardly beneath and between the wheels of the rear wheel assembly and the remaining impinging air is directed laterally around the wheels of the rear wheel assembly to suppress water spray and to reduce the aerodynamic drag of the wheel assembly.

2. The air deflector of claim 1, further including bracket means for rigidly securing said fairing to a vehicle body so that said area of maximum extension on said fairing extends toward the front of a vehicle body.

3. The air deflector of claim 1, wherein said fairing is adapted to be mounted on a vehicle body so that its front surface extends downwardly below the axle level of wheel assembly.

4. The air deflector of claim 3, further including first and second side brackets for securing said fairing to a vehicle body.

5. The air deflector of claim 4, wherein said first and second side brackets are fastened to said first and second side edges, respectively, of said fairing, said side brackets comprising panels which further direct air along the outside of a wheel assembly.

6. An air deflector for reducing the aerodynamic drag of the rear wheel assembly for vehicles such as trucks and trailers and for suppressing the spraying of water thereby, comprising:

top, bottom, and first and second side edges defining a generally rectangular fairing body of sufficient width to extend laterally completely across a vehicle body;

a continuous, contoured front fairing surface curving laterally downwardly and rearwardly from an area of maximum forward extension toward said bottom and said first and second side edges, said front surface being substantially symmetrical about a vertical plane passing through said area of maximum extension and through the center of said fairing;

a plurality of horizontal air flow channels formed in said front fairing surface to direct impinging air laterally around the fairing and along the outside of the wheel assembly of a vehicle; and a plurality of vertical air flow channels formed in said front fairing surface to direct impinging air downwardly around the fairing and between the wheels of a wheel assembly of a vehicle.

7. The air deflector of claim 6, wherein said generally vertical channels are angled toward said vertical plane passing through the center of said fairing.

8. The air deflector of claim 7, wherein said generally horizontal channels comprise first and second grooves extending to said first and second sides edges, respectively.

9. The air deflector of claim 7, wherein each of said generally vertical channels extends from said top edge to said bottom edge of said fairing.

10. The air deflector of claim 9, wherein said air flow channels each comprise a groove having a constant width and a varying depth, whereby said grooves are tapered from one end to the other.

11. The air deflector of claim 7, further including means for mounting the deflector under the body of a vehicle and forward of a wheel assembly thereof, whereby said air deflector grooves will direct air around and between the wheels of the wheel assembly to suppress spray and reduce aerodynamic drag.

* * * * *